(12) United States Patent
Chandra et al.

(10) Patent No.: US 9,910,762 B2
(45) Date of Patent: Mar. 6, 2018

(54) UNIFIED SANDBOX

(71) Applicant: Oracle International Corporation, Redwood Shores, CA (US)

(72) Inventors: Charu Chandra, Redwood City, CA (US); Denny McKinney, Los Altos, CA (US); Jeremy Liu, San Carlos, CA (US); Rohit Marwaha, Cupertino, CA (US); George Kellner, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 60 days.

(21) Appl. No.: 15/168,298

(22) Filed: May 31, 2016

(65) Prior Publication Data
US 2017/0052879 A1 Feb. 23, 2017

Related U.S. Application Data

(60) Provisional application No. 62/208,037, filed on Aug. 21, 2015.

(51) Int. Cl.
*G06F 9/44* (2006.01)
*G06F 11/36* (2006.01)

(52) U.S. Cl.
CPC ...... *G06F 11/3668* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 7,460,553 B2 * | 12/2008 | Riveiro Insua | H04B 3/54 370/210 |
| 8,782,604 B2 | 7/2014 | Konduri et al. | |
| 8,966,464 B1 * | 2/2015 | Christopher | G06F 11/0712 717/166 |

(Continued)

OTHER PUBLICATIONS

Oracle White Paper, "Metadata Services (MDS) in Fusion Middleware 11g", Build Rich, Customizable Enterprise 2.0 Applications with Oracle WebCenter 11g, Dec. 2009, pp. 1-23.

*Primary Examiner* — Wei Zhen
*Assistant Examiner* — Binh Luu
(74) *Attorney, Agent, or Firm* — Miles & Stockbridge P.C.

(57) ABSTRACT

A system that manages a unified sandbox environment activates a plurality of components in the unified sandbox environment, each component being configured to manage the lifecycle of its own component data. The system orchestrates an operation across the unified sandbox environment, the orchestrating including delegating one or more operations to the components, the components being configured to wait until all delegated operations are completed successfully before committing changes based on the delegated operations. The system manages a central label repository including distributing labels to the components, the components being configured to associate the centrally managed labels with versions of their respective component data. The system then creates a unified sandbox view across the respective component data of all components based on a selection of one or more of the centrally managed labels.

20 Claims, 19 Drawing Sheets

(56) References Cited

U.S. PATENT DOCUMENTS

| | | | | |
|---|---|---|---|---|
| 8,984,016 B2* | 3/2015 | Marquez | ............ | G06F 17/5018 |
| | | | | 707/793 |
| 2006/0117325 A1* | 6/2006 | Wieland | ................. | G06F 9/468 |
| | | | | 719/321 |
| 2006/0200565 A1* | 9/2006 | Ng | .......................... | G06F 9/541 |
| | | | | 709/227 |
| 2009/0043800 A1* | 2/2009 | Fox | .................. | G06F 17/30864 |
| | | | | 707/999.102 |
| 2009/0183168 A1* | 7/2009 | Uchida | ................ | G06F 9/5027 |
| | | | | 718/104 |
| 2009/0259993 A1* | 10/2009 | Konduri | ............. | G06F 11/3664 |
| | | | | 717/127 |
| 2014/0282392 A1* | 9/2014 | Shukla | ................... | G06F 9/443 |
| | | | | 717/116 |

* cited by examiner

800

900

1200

| | What It Does | Input Arguments | What It Returns | When Unified Sandbox Calls It |
|---|---|---|---|---|
| getChanges | Returns the changes occurred in a unified sandbox. | 1. Unified sandbox information. | A ChangeSet object. A ChangeSet contains a summary and a collection of ObjectDiffs objects. Each ObjectDiffs object contains the following information:<br>• Name: the name of the customizable object.<br>• Type: the type of the customizable object.<br>• Update Date: the most recent date (and time) when the customization object is customized.<br>• Updated By: the user that made the changes.<br>• Summary: the summary of the changes to this customizable object. This is where the actual changes are described.<br>• URL: the link to the tool page where the customizable object is customized.<br>• Archived: whether a change is from an archive. An archived change cannot be further modified. It is not effective at runtime but can be published into mainline. | Invoked when the details of a unified sandbox are displayed. |
| getConflicts | Returns the conflicted changes indicated by a MergeConflictsException. | 1. Unified sandbox information.<br>2. A MergeConflictsException object. This exception is thrown by one of the sandboxed repositories either during refresh or publish. This object contains a ChangeSet object which describes the conflicted customization artifacts. | A ChangeSet object. Similar to the returned object of getChanges, getConflicts returns the high-level description of the conflicts as a list of ObjectDiffs objects. Theoretically this list should be a sub-set of the ChangeSet object returned by getChanges. | Invoked when the details of a unified sandbox are displayed. Since the conflicts are a sub-set of the changes, the conflicts are marked in the change list instead of being displayed separately. |

| | What It Does | Input Arguments | What It Returns | When Unified Sandbox Calls It |
|---|---|---|---|---|
| branch | Prepares a branch that contains copies of all customization artifacts for the given unified sandbox. The sources of the copies are based on the versions of a mainline label. | 1. Unified sandbox information. 2. A mainline label which the copies are based on. | A String that identifies the branch for the given unified sandbox. This is the initial repository baseline for the unified sandbox. It is essentially the key to the branch. This String is usually a variation of the unified sandbox ID. It is recorded by Unified Sandbox administration and can be retrieved later at runtime, so the runtime can get to the branch given a unified sandbox ID. | Invoked when this repository is first included in a unified sandbox via a customization feature. Note that the inclusion does not necessarily occur when a unified sandbox is created. The cost of branching may not affect the performance of the creation of a unified sandbox. |
| refresh / undo | Compares the branch for the given unified sandbox with a mainline label or mainline tip, and updates the branch with the differences. There may be conflicts if an artifact has been updated in the branch as well as in mainline. In short, this is data synchronization from mainline to a branch. | 1. Unified sandbox information. 2. A mainline label, or null to indicate that the synchronization should be from the mainline tip to the branch. | An UnloadedChanges object that reports changes, commits the changes and cancels the operation as instructed by Unified Sandbox administration. Report Changes: (This operation is currently optional because it is not invoked by the administration UI.) Only artifacts that have been updated (or created) in mainline are reported. Merge Conflicts: MergeConflictsException must be thrown to report all merge conflicts. The exception itself must contain information about the conflicts. Undo: The state of the branch must be restored as if refresh has never happened. Commit: refresh must be finalized. Once committed, refresh cannot be undone. Practically this code be where the refresh operation actually happens. New Repository Baseline: The commit method may return a String that identifies the refreshed branch for the given unified sandbox. Similar to the returned String from branch, this identifier is recorded by Unified Sandbox administration. This is useful when a branch is not refreshed in place. For example, a copy of a branch can be made before refresh. The copy is refreshed and the identifier to the copy is returned by commit. Now this copy will be identified as the branch for the unified sandbox. | Invoked when a unified sandbox is refreshed. This is normally a user-initiated operation. Unified Sandbox administration calls refresh of every participating repository. If any of the repositories reports any issues such as merge conflicts, the refresh of the unified sandbox is cancelled. In that case, all participating repositories are notified to undo the changes resulted from refresh if any. If there is no issue reported, all participating repositories are notified to commit the changes resulted from refresh if any. |

Fig. 15

| | | | |
|---|---|---|---|
| publish / undo | Compares the branch for the given unified sandbox with the mainline tip, and updates the mainline tip with the differences. There may be conflicts if an artifact has been updated in the branch as well as in mainline tip. In short, this is data synchronization from a branch to mainline tip. | 1. Unified sandbox information. | An UndoableChanges object that reports changes, commits the changes and cancels the operation as instructed by Unified Sandbox administration.<br><br>Report Changes: (This operation is currently optional because it is not invoked by the administration UI.) Only artifacts that have been updated (or created) in the branch are reported.<br><br>Merge Conflicts: MergeConflictsException must be thrown to report all merge conflicts. The exception itself must contain information about the conflicts.<br><br>Undo: The mainline state must be restored as if publish has never happened. The pre-certified label, if available, is passed in.<br><br>Commit: publish must be finalized. Once committed, publish cannot be undone. Practically this could be where the publish operation actually happens.<br><br>Mainline Label: The commit method must return a label that marks the beginning of a certified baseline. This mainline label will be recorded by Unified Sandbox administration as the latest certified label. | Invoked when a unified sandbox is published. This is normally a user-initiated operation. Unified Sandbox administration disallows publish until after the branch is refreshed to the latest mainline label at tip.<br><br>Unified Sandbox administration calls publish of every participating repository. If any of the repositories reports any issues such as merge conflicts, the publish of the unified sandbox is canceled. In that case, all participating repositories are notified to undo the changes resulted from publish if any.<br><br>If there is no issue reported, all participating repositories are notified to commit the changes resulted from publish if any. |
| destroy | Deletes the branch for the given unified sandbox. Once a branch is deleted, it cannot be recovered. | 1. Unified sandbox information. | None. | Invoked when a unified sandbox is deleted. This is normally a user-initiated operation. Unified Sandbox administration makes sure the sandbox to be deleted is not in use. In certain cases, destroy may not be called if Unified Sandbox administration decides to perform a "soft delete" by simply updating the unified sandbox to an inactive state. |

| | | |
|---|---|---|
| getChanges | Returns the changes made in the branch, excluding the changes brought in from mainline by refresh. | |
| | 1. Unified sandbox information. | A ChangeSet object. A ChangeSet object contains a summary and a collection of ObjectDiffs objects. Each ObjectDiffs object contains the following information:<br><br>• Name: the name of the customization artifact.<br>• Type: the type of the customization artifact.<br>• Summary: the summary of the changes to the customization artifact. This is where the actual changes are described.<br>• Update Date: the most recent date (and time) when the customization artifact was changed.<br>• Updated By: the user that made the changes.<br>• Archived: whether an artifact is from an archive. An archived artifact cannot be further modified. It is not effective at runtime but can be published into mainline.<br><br>This information may be used by customization features to determine the changes to a customization object. | May be invoked by the implementation of a customization feature. Unified Sandbox gets changes from customization features, not from sandboxed repositories directly. |

| | What It Does | Input Arguments | What It Returns | When Unified Sandbox Calls It |
|---|---|---|---|---|
| branch (from archive) | Creates a branch for the given unified sandbox with the archive as the initial contents. | 1. Unified sandbox information. 2. A SandboxArchive object. | A String that identifies the branch for the given unified sandbox. See branch for more details. | Invoked when a unified sandbox is created from an archive. For example, a unified sandbox may be created from CSM exported customization artifacts. |
| prePublish | Prepares for publish if needed. | 1. Unified sandbox information. | The pre-certified label, or null if the pre-certified label is simply the latest certified label. | Invoked immediately before operation publish is invoked. |
| refreshCompleted | Populates derived artifacts in the branch for the given unified sandbox if any. | 1. Unified sandbox information. | None. | Invoked when all participating repositories have been successfully refreshed. In other words, this is invoked only after the unified sandbox as a whole is refreshed successfully. The refresh action has been completed prior to this invocation. There is no chance of rollback. This is the place where post-processing can be done. |
| publishCompleted | Populates derived artifacts in mainline if any. | 1. Unified sandbox information. | None. | Invoked when all participating repositories have been successfully published. In other words, this is invoked only after the unified sandbox as a whole is published successfully. The publish action has been completed prior to this invocation. There is no chance of rollback. This is the place where post-processing can be done. |
| test | Performs basic integrity testing on the branch for the current unified sandbox. | 1. Unified sandbox information. 2. A TestListener object that listens to the progress of testing. | A TestResult object that may contain hierarchical test information. The organization of the test results is similar to that in JUnit framework -- a TestResult object that contains the result of a single test, or itself is a TestSuiteResult that contains a collection of TestResults. | Invoked by a user through Unified Sandbox administration UI. This feature is currently not available on the UI. Note that a unified sandbox can be tested only when the user that initiates the testing is in the unified sandbox. (Coming soon.) |

Fig. 16

UNIFIED SANDBOX

CROSS-REFERENCE TO RELATED APPLICATIONS

The present application claims the benefit of U.S. Provisional Application No. 62/208,037, filed Aug. 21, 2015, which is hereby incorporated by reference in its entirety.

FIELD

One embodiment is directed generally to a computer system, and in particular to a computer system that manages a sandbox environment.

BACKGROUND INFORMATION

For many software applications, and Software as a Service ("SaaS") applications in particular, the ability to customize the applications is very important Customers rarely use the application as it comes "out of the box". Instead, customers will tailor the application for their particular needs, including business needs, look and feel needs, particular business processes, etc.

With some known SaaS implementations, customers have separate environments. For example, SaaS applications from Salesforce.com Inc. use both a sandbox test environment and a production/publish environment to perform customizations and publish them to all users. One problem with this approach is a new separate environment is required for each sandbox. Each environment is expensive and requires separate maintenance.

With some other known SaaS implementations, sandbox coverage is only available for certain forms of customizations and configurations. For example, MetaData Service ("MDS") from Oracle Corp. provides an MDS sandbox for only those customizations that use MDS as a metadata store. However, there are other customizations and configurations that customers can perform that do not directly use MDS as a metadata store, and in turn, cannot use MDS sandboxing. Changes to these objects may be directly written into the database and become immediately active for all users.

SUMMARY

One embodiment is a system that manages a unified sandbox environment. The system activates a plurality of components in the unified sandbox environment, each component being configured to manage the lifecycle of its own component data. The system orchestrates an operation across the unified sandbox environment, the orchestrating including delegating one or more operations to the components, the components being configured to wait until all delegated operations are completed successfully before committing changes based on the delegated operations. The system manages a central label repository including distributing labels to the components, the components being configured to associate the centrally managed labels with versions of their respective component data. The system then creates a unified sandbox view across the respective component data of all components based on a selection of one or more of the centrally managed labels.

BRIEF DESCRIPTION OF THE DRAWINGS

FIG. 13 is a table defining operations supported by each customization feature, in accordance with an embodiment of the invention.

FIG. 15 is a table illustrating operations supported by a sandboxed repository, in accordance with an embodiment of the invention.

FIG. 16 is a table illustrating additional operations that are supported by a sandboxed repository, in accordance with an embodiment of the invention.

DETAILED DESCRIPTION

According to an embodiment, a system is provided that includes a unified sandbox framework for managing multiple different sandboxes/repositories in a single unified sandbox environment, where the sandboxes can have different repositories/technologies (i.e., the unified sandbox framework unifies multiple heterogeneous sandboxes/repositories). The unified sandbox framework allows one user to make changes within a sandbox within the environment, and other users in the same environment will not be able to see those changes. The user can then publish the changes for all other users to see within the environment. To create a unified view across sandboxes/repositories, the unified sandbox framework manages a central label repository in some embodiments.

Figure 1:
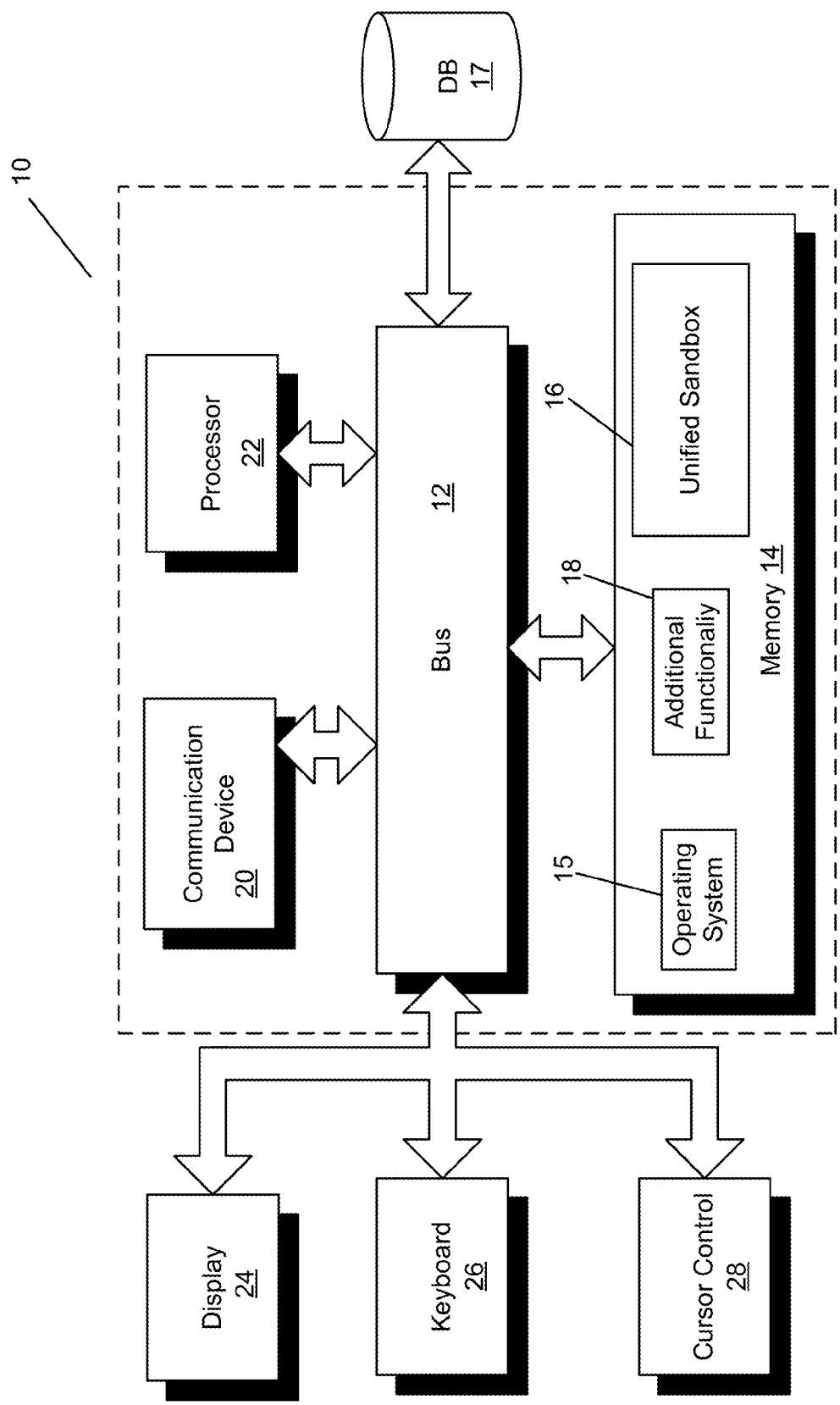
FIG. 1 is a block diagram of a computer system that can implement an embodiment of the present invention.

FIG. 1 is a block diagram of a computer system 10 that can implement an embodiment of the present invention. Although shown as a single system, the functionality of system 10 can be implemented as a distributed system.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a unified sandbox module 16 for providing the unified sandbox functionality, and all other functionality disclosed herein. System 10 can be part of a larger system. Therefore, system 10 can include one or more additional functional modules 18 to include the additional functionality, such as a one or more SaaS applications.

A database 17 is coupled to bus 12 to provide centralized storage for modules 16 and 18 and store all needed repositories, etc. Database 17 can store data in an integrated collection of logically-related records or files. Database 17 can be an operational database, an analytical database, a data warehouse, a distributed database, an end-user database, an external database, a navigational database, an in-memory database, a document-oriented database, a real-time database, a relational database, an object-oriented database, or any other database known in the art.

In one embodiment, system 10 is configured to provide a unified sandbox platform/framework of module 16 to manage multiple different sandboxes/repositories in a single unified sandbox environment, where the sandboxes can have different repositories/technologies (i.e., heterogeneous). The unified sandbox platform/framework enables one user can make changes within a sandbox within the environment, and other users in the same environment will not be able to see those changes. The user can then publish the changes for all other users to see within the environment. An "environment" is a deployment or instance of an application in one embodiment. For multi-tenancy environments, such as "Fusion" applications from Oracle Corp., a customer is given a test instance, a stage instance and a production instance. Multiple virtual instances are created within one repository/database for isolation purposes.

Each sandbox instance is a virtualization of what isolation means for the particular component/infrastructure. For example, for "Oracle Metadata Services" ("MDS") from Oracle Corp., rows and tables are used to isolate the contents of the sandbox. The MDS rows are associated with a label or stripe of metadata. The label is a common value that is shared across all the participants associated with the unified sandbox. In contrast, for a tool that uses a file store to manage metadata, creating a new file and managing changes within the sandbox are file based isolation. Therefore, each sandbox component must provide functionality that defines what isolation means for that component. Each part of an enterprise application can participate in the sandbox by centrally managing the labels and centrally orchestrating a consistent view of metadata.

Further, one embodiment is a generic platform (i.e., a unified sandbox) that allows any number of sandboxes/repositories to plug into the platform using a standardized interface. It includes clear event points to which individual components can react. Embodiments provide two-phase commit across multiple repositories. For example, an MDS-based sandbox and a business intelligence ("BI")-based sandbox, each with its own repository, can plug into the platform. Embodiments provide orchestration across the multiple repositories. Embodiments allow users to see the changes made in sandboxes across multiple metadata repositories. For example, five different MDS repositories can exist in the unified sandbox. Embodiments allow for refresh over multiple repositories. In one embodiment, all repositories must succeed in refresh, publish, etc., or all will revert back to prior operations. Embodiments include a novel user interface that presents users with a list of changes and the ability to conduct rollbacks and provide a link from a change directly to the customization tool that made the changes. Embodiments allow for refresh from the latest published changes (e.g., refresh from a mainline or mainline tip) or changes that have been published by other sandboxes. Embodiments include a user interface to view and review refresh results and potential conflicts.

One embodiment provides a pluggable model for a unified sandbox which allows customers to customize applications in a safety zone without impacting other users on the system. Multiple users can have their own sandboxes, run the applications with their changes applied, and make changes in parallel and eventually merge their changes together into the system.

The unified sandbox infrastructure in accordance with one embodiment orchestrates a federated set of component sandboxes. From the user's perspective, there is one overarching sandbox that collects individual changes/customizations made across the various components and allows the user to centrally manage changes. Each pluggable component can each have its own version of a repository (e.g., a metadata repository) and can participate in an orchestrated lifecycle of actions, such create, refresh and publish, within the sandbox. By having multiple customization tools use a common sandbox, customizations that are related can all be published (making them available to all users) together.

Figure 2:
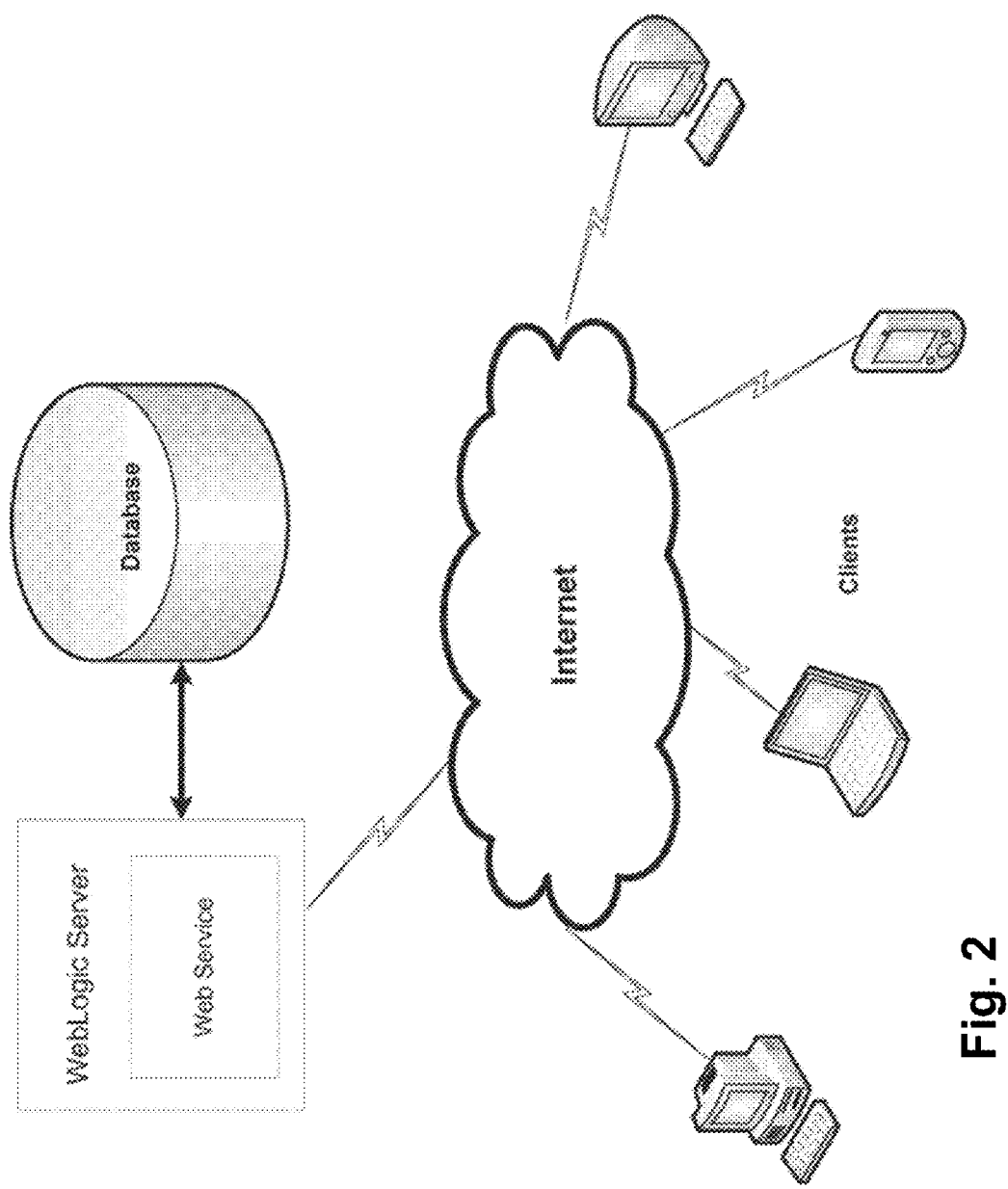
FIG. 2 is a block diagram that illustrates a plurality of clients that access a web service in one embodiment.

FIG. 2 is a block diagram that illustrates a plurality of clients that access a web service that is implemented on a WebLogic Server from Oracle Corp. in one embodiment. In other embodiments, other implementations of a web service can be used. The web service implements the unified sandbox functionality as disclosed herein, and other SaaS functionality. The web service accesses a database/repository or multiple repositories (not shown). Each client executes a browser or other functionality to allow a user to access the web service.

Figure 3:
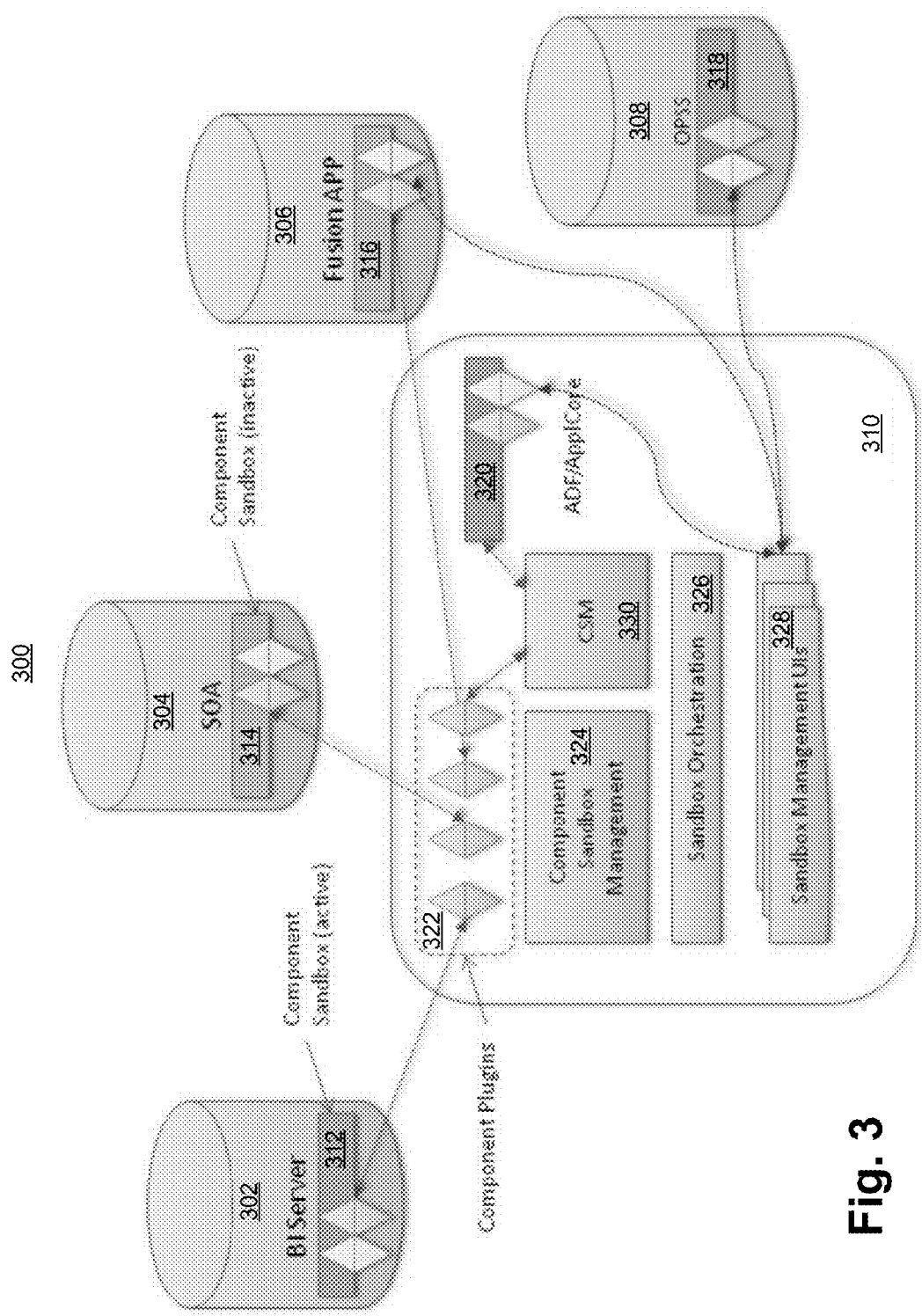
FIG. 3 illustrates a topology of the unified sandbox in accordance with embodiments of the invention.

FIG. 3 illustrates a topology 300 of the unified sandbox in accordance with embodiments of the invention. Topology 300 includes a business intelligence ("BI") component 302, a service-oriented architecture ("SOA") component 304, an application component 306 (e.g., a unified sandboxing version of one of the Oracle Fusion Applications ("OFA") from Oracle Corp.), a security services component 308 (e.g., a unified sandboxing version of Oracle Platform Security Services ("OPSS") from Oracle Corp.), and a unified sandbox platform 310. Unified sandbox platform 310 includes a component sandbox management module 324, a sandbox orchestration module 326, a CSM module 330, and sandbox management user interface modules 328. In some embodiments, unified sandbox platform 310 utilizes the Oracle Fusion Application Toolkit from Oracle Corp. Components 302-308 include respective component sandboxes (or component repositories) 312-318. Unified sandbox platform 310 includes a default sandbox (or default repository) 320. Unified sandbox platform 310 in one embodiment is implemented by the web service of FIG. 2.

Unified sandbox platform 310 orchestrates creating, refreshing, and publishing component sandboxes across the different technologies that can be customized in applications/services such as those provided by components 302-308. The boundary of the set of changes that can be contained within a component sandbox (e.g., component sandboxes/repositories 312-318 and default sandbox/repository 320) is defined by the footprint of the technology component that registers/participates in the unified sandbox. For example, a component using Oracle Application Development Framework by Oracle Corp. ("ADF") can have an ADF component sandbox that can hold ADF based changes such as, for example, "Application Composer," Jedi, and MDS based changes. In another example, a component using Application Core from Oracle Corp ("ApplCore") can have an ApplCore sandbox that can hold ApplCore-based changes such as, for example, Lookups, Messages, Flexfields and other ApplCore components. SOA component sandbox 314 can hold the changes that SOA component 304 deems necessary from a customization standpoint, etc.

Unified sandbox platform 310 orchestrates a federated set of component sandboxes. From the user's perspective, there's one overarching sandbox that collects individual changes/customizations made across the various components 302-308 and allows the user to centrally manage changes.

In some embodiments, unified sandbox 310 implements a default configuration of a sandbox which includes application framework artifacts such as, for example, ADF and/or ApplCore based changes.

In some embodiments, individual component sandboxes 312-320 are activated into the unified sandbox when the user decides to make changes for that component within the scope of an active unified sandbox session. This on-demand activation model will ensure that the cost of cloning data for each component is not incurred unless a user wants to make a component-specific change.

Federated component sandboxes 312-318 implement a versioning scheme and register to participate in the unified sandbox. Unified sandbox orchestration module 326 manages operations defined in a sandbox state model such as, for example, those shown in FIGS. 4 and 8, across the various component sandboxes 312-318.

Figure 4:
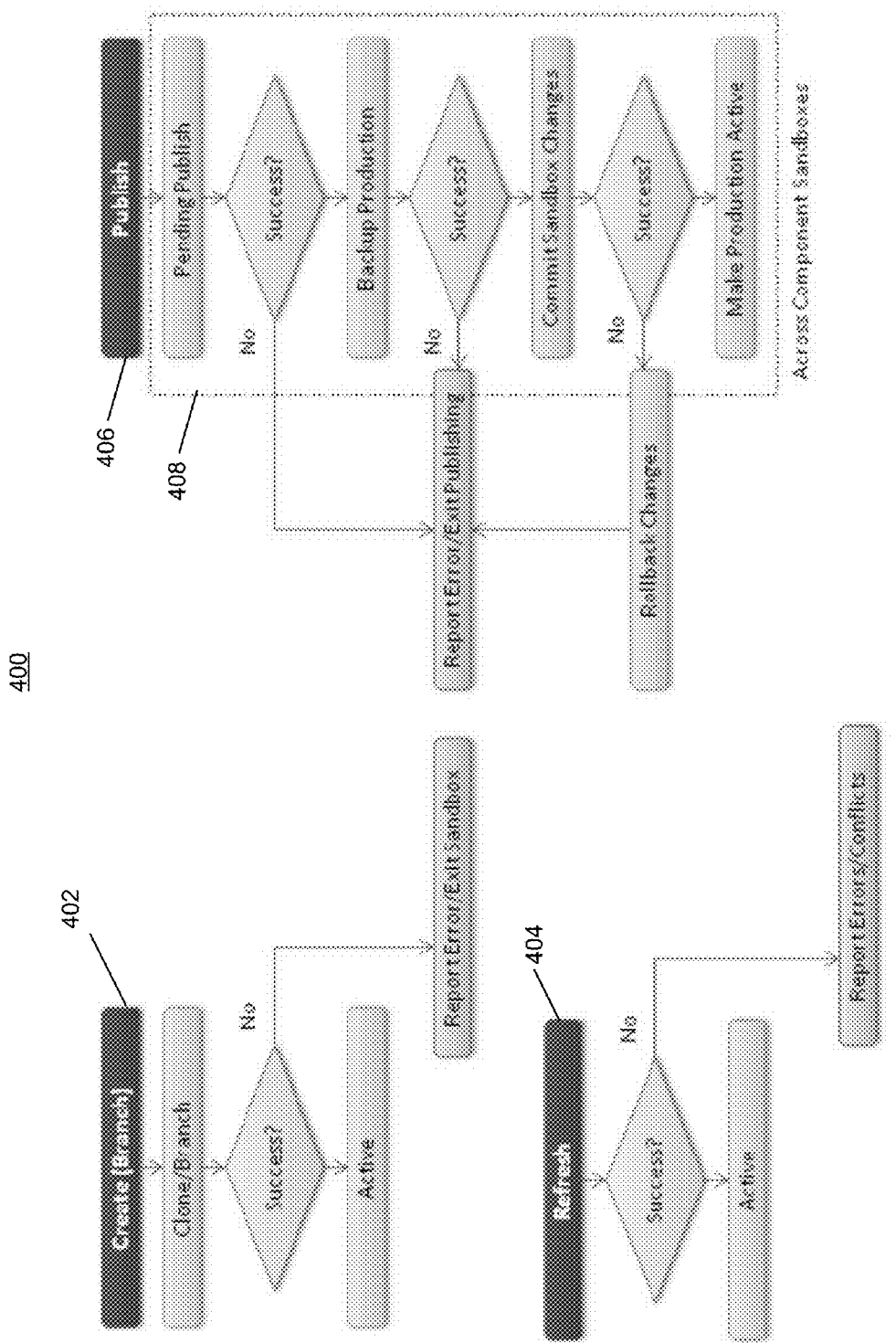
FIG. 4 illustrates a state model of a unified sandbox in accordance with embodiments of the invention.

FIG. 4 illustrates a state model 400 of a unified sandbox in accordance with embodiments of the invention. Model 400 includes four top-level operations that can be performed on a unified sandbox: a create (branch) operation 402, a publish operation 406, a refresh operation 404, and an abandon operation (not shown).

Create (branch) operation 402 creates a new sandbox with a default configuration (e.g., a sandbox which includes application framework artifacts such as, for example, ADF and ApplCore based changes). Publish operation 404 calls a "publish" action 408 on active sandbox components of the unified sandbox. Components backup their state and attempt to publish the sandbox. An error in any one of the component sandboxes will result in a failure to publish the unified sandbox and a rollback is performed across all components active within the sandbox to the state existing at the time the publish operation was called. Refresh operation 404 notifies all active sandbox components to "refresh" the contents of the sandbox with changes done in the component repositories on production data since the sandbox component was activated within the unified sandbox. An error in refresh will result in the sandbox entering an "error" or "conflict" state. The abandon operation deletes sandbox contents/versions for all active sandbox components within the unified sandbox.

In embodiments, administrators are able to promote (i.e., publish) the changes in the unified sandbox with the ability to undo the promotion when conflicts/errors occur. This ensures that changes in a sandbox are applied to the mainline as an atomic transaction. Administrators are also able to test the contents/changes within the unified sandbox against live production data (e.g., live production metadata and transaction data).

In embodiments, the publishing of all sandboxes is synchronized to, for example, avoid data integrity issues. When a sandbox starts being promoted, all other sandboxes cannot be published. When a user attempts to publish a sandbox while another sandbox is being published, the operation is either canceled with a message, or is queued.

Sandbox changes can be promoted first with the ability to be undone after being promoted to allow for automatic testing to be done on the mainline with the sandbox changes applied, but without the changes being visible to all users. Individual repositories can cancel the promotion in case an error or a conflict occurs in the repository, so that all repositories in the sandbox can be updated or rolled back as a whole. Once all repositories are successfully promoted, the changes can be committed. Once committed, each repository reports its new baseline that contains the sandbox changes. The collection of the baselines is then recorded as certified.

As discussed above, in some embodiments, a default configuration when a user creates/activates a unified sandbox can be used which includes, for example, ADF and ApplCore components. This configuration supports the typical customizations that administrators perform when implementing/setting up an application for their user base (for example, changes to page look and feel, changes to terminology, data security setup, customizing business objects, etc.). Other "sandbox-aware" components can be activated into the sandbox in an on-demand fashion. This allows for the cost of a component participating in the unified sandbox (e.g., cloning of data, managing multiple versions, publishing overhead, etc.) to be incurred when that component is activated within an active sandbox session.

Figure 5:
FIG. 5 illustrates a status UI element that indicates whether a sandbox session is active and whether a component has been activated within the current sandbox, in accordance with an embodiment.

FIG. 5 illustrates a status UI element 500 that indicates whether a sandbox session is active and whether a component has been activated within the current sandbox, in accordance with an embodiment. Activating a component within an active sandbox session can be controlled by status UI element 500 (e.g., a chrome-level status UI component) that indicates whether a sandbox session is active (which allows the user to launch the sandbox console) and whether the component has been activated within the current sandbox. Users can activate the component within the sandbox if they intend to make changes that need to be sandboxed. Sandbox UI element 500 indicates to users when the component has been fully activated within the sandbox session.

In embodiments, when users navigate to a component setup/landing page from sandbox management UIs 328 of FIG. 3, if a component is not yet active within the sandbox, the user will be prompted to activate the component before proceeding. An information/action icon against each component in the navigation menu will indicate which components are currently active within the sandbox.

In an example use-case, a user/administrator of an Oracle Fusion application creates a unified sandbox and gets ADF and ApplCore by default. The administrator adds a new attribute "zip code" to an "orders" business object via "Application Composer," and this change is made in the unified sandbox and not visible to all users. The administrator navigates to a business intelligence ("BI") design tool to add the new attribute to a BI report. The BI component sandbox (e.g., component sandbox 312 shown in FIG. 3) has not yet been created at this time. The administrator activates the BI design tool into the unified sandbox. Changes that are made to the BI report now are only visible within the context of the active unified sandbox. If the administrator had not activated the BI component into the unified sandbox, the changes to the orders business object would not be visible in the BI tool because the changes to the orders object were made in the unified sandbox.

In another use-case, a user/administrator of an Oracle Fusion application creates a unified sandbox and gets ADF and ApplCore by default. The administrator changes a prompt via a Fusion "Page Composer." The administrator navigates to a BI tool to run a few reports. The BI component sandbox has not been created, but the administrator does not intend to make any changes in the BI component (i.e., just running reports). The administrator does not activate the BI component within the sandbox and continues to the BI tool with production metadata.

In another use-case, a user/administrator of an Oracle Fusion application creates a sandbox and gets ADF and ApplCore by default. The administrator tries to navigate to a BI component from the sandbox management UIs 328. A menu or other UI element (e.g., UI element 500 shown in FIG. 5) indicates that the BI component is not active within the sandbox. The administrator is prompted with a dialog to activate the BI component. The administrator is navigated to the BI component once activation completes.

During an active sandbox session, the user can navigate freely through the set of components/applications that the user has access to. This set could include components/pages that contain elements that are sandboxed (i.e., changes made via these elements are only visible within the context of that sandbox), and pages/components that do not (for example, one or more transactional UIs in some applications such as, for example, Oracle Fusion Apps).

In some embodiments, the regions/actions that are sandboxable are highlighted by a set of information icons which can help to set the correct user expectations on what is and/or can become active within a sandbox. Components that are sandbox-aware include these active UI elements in their pages/components that are sandboxable. Such UI components read the active sandbox information from the user session and render only within the context of an active sandbox session. In some embodiments, sandbox management UIs 328 include a set of navigational elements to guide users to the appropriate sandbox-aware tasks/tools. Menus can also be aware of the active components within the sandbox and will prompt the user to activate a component if the user tries to navigate to the component that has not been activated for the sandbox.

In some embodiments, UI components for each of the sandboxable components are configured such that technology components can embed in the UI chrome that frames their tools. This UI comportment allows users to launch the sandbox management console and also allows users to activate that technology component within the sandbox if it has not been activated as yet.

In some embodiments, to set the correct user expectations, sandbox-aware tasks will be annotated with additional metadata so a filtered list of sandbox-aware tasks can be presented to users when they launch from the sandbox management UIs 328 to a tool that includes both sandbox-aware and non-sandboxed tasks.

Figure 6:
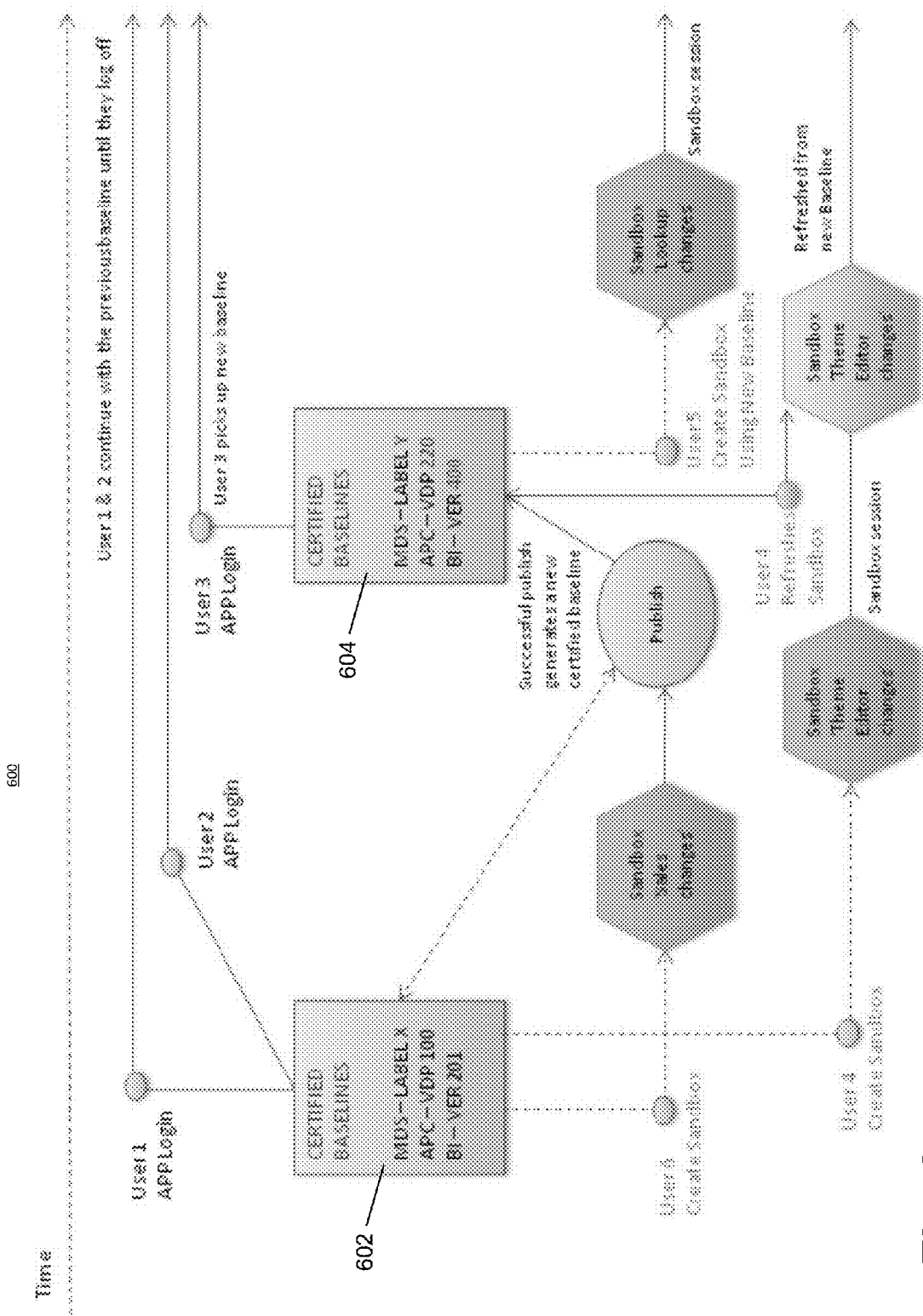
FIG. 6 illustrates a sequence diagram of the functionality of a certified baseline method for managing read and transaction consistency across multiple repositories of a unified sandbox, in accordance with an embodiment.

FIG. 6 illustrates a sequence diagram 600 of the functionality of a certified baseline (or certified label) method for managing read and transaction consistency across multiple repositories of a unified sandbox, in accordance with an embodiment.

In embodiments, read consistency is managed across the different repositories of the unified sandbox by using certified labels. For example, read-consistency of data (e.g., metadata and/or their derived objects) across a distributed set of repositories (e.g., metadata repositories) may be a concern when, for example, the time it takes to apply/promote changes is not zero. If read consistency is not managed properly, users may, for example, get inconsistent versions of dependent objects in the runtime system. This problem is further amplified when there are a distributed set of repositories as there may be loosely coupled metadata across the repositories that can lead to similar read consistency issues as the unified sandbox orchestrates a distributed publish across the repositories and each repository is expected to have different publish times.

Transaction consistency may also be a concern when publishing changes to a set of distributed repositories that can also be updated by user actions while the publish action is active. In addition, a roll back of all distributed repositories that participate in the unified sandbox to their 'last good' state if a single repository reports a publish error or if a backup fails. Both these issues result in unpublishable sandboxes, but also leave the "current" state of the system in an inconsistent state which can lead to issues that can be incredibly hard to diagnose, and in the worst case, lead to a catastrophic failure of the system.

In some embodiments, the read and transaction consistency concerns are addressed by configuring the unified sandbox such that changes are published when the system is in read-only mode. This can be achieved by taking some down time of all impacted applications or by introducing a "read-only" mode for all applications.

Alternatively, some embodiments maintain, for each repository, a read-consistent and non-writeable (other than via a sandbox publish) certified baseline label, such as, for example, those shown in FIG. 6.

The certified baseline comprises one or more labels that correspond to the current published data stored in each of the repositories of the unified sandbox. The certified baseline is looked-up on login and activated for every user. The certified baseline is only changed when a successfully publish of a unified sandbox is orchestrated and all repositories succeed. This ensures that a user is always presented with a read-consistent view of metadata, regardless of other changes that may be being published in other labels/versions.

The certified baseline method provides support for read and transaction consistency without adding any downtime. The certified baseline approach addresses the issue of allowing changes to be made on "mainline" metadata that can conflict with the current state of metadata-derived objects. It avoids taking a backup prior to publishing a sandbox and because the publish action happens on a copy of the certified baseline, any publish errors have no consequences, to either the sandbox, or the certified version that users are actively on. In addition, the certified baseline approach allows embodiments to not require a "restore" action in the case of a publish failure since any publish failures have no impact on users or even the contents of the sandbox. The certified baseline approach can potentially reduce the set of changes that generate conflicts during a publish operation, as changes will be "gated" by a sandbox (i.e., no direct user "write" access to the certified baseline version of data). The certified baseline approach therefore can also lower overall memory usage.

In embodiments employing the certified baseline method, changes to any versioned repository are "gated" by a sandbox (i.e., customizations to the system go through a sandbox publish cycle). In some embodiments, a list of sandbox-enabled customization tools is provided in management user interfaces such as, for example, sandbox management UIs 328 shown in FIG. 3. A bookkeeping database table, CERTIFIED_LABELS, maintains a list of sandbox components and their corresponding certified baseline labels. This table is the source of truth of the set of component labels that make up a read-consistent view of the versioned data. When a unified sandbox is created, data for the sandbox is cloned/branched from the current certified baseline stored in CERTIFIED_LABELS. A publish action (e.g., publish operation 406 shown in FIG. 4) will request from each repository a new baseline label if successful. If all impacted repositories successfully generate new successful baseline labels, CERTIFIED_LABELS is updated with the new labels and users will pick up the new certified baseline which comprises the new labels. The previous baseline labels are not deleted so that existing users on the system who are tagged on the previous baseline will continue to be consistent until they logoff the system.

When a user logs on to the system, the current certified baseline is read from CERTIFIED_LABELS and the user context is setup for the life of the user's session with the current certified baseline. Versioned repositories that participate in the unified sandbox can also access the label information to activate the correct label for their components. Active users can also be notified if a new baseline is certified.

Users can be switched to a newly generated certified baseline at login and/or at a specified maintenance window when all users are logged out of the system. When switching users at login, new users activate into the new certified baseline, users currently logged into the system retain the earlier certified baseline (i.e., the certified baseline that was current at the time when they logged in) until they log out and back in or until they perform a refresh operation. For example, Users 1 and 2 log into the system and acquire earlier certified baseline 602 before user 6 publishes changes to create new certified baseline 604. User 4 now logs in and acquires certified baseline 604, while users 1 and 2 continue to use earlier certified baseline 602 until they exit the application.

Switching users to a newly generated certified baseline at specified maintenance window when all users are logged out of the system has no impact on users current activity, but requires downtime and may be difficult to enforce for global businesses. In addition, this approach may require migration of user customizations made from the time the new certified baseline was created to when it was activated may need to be migrated.

In embodiments, the certified baseline is also established after certain lifecycle actions that successfully modify production data such as, for example, provisioning (e.g., initial configuration and seed data for an offering) and patching (e.g., one-offs, release update patches, etc.).

Figure 7:
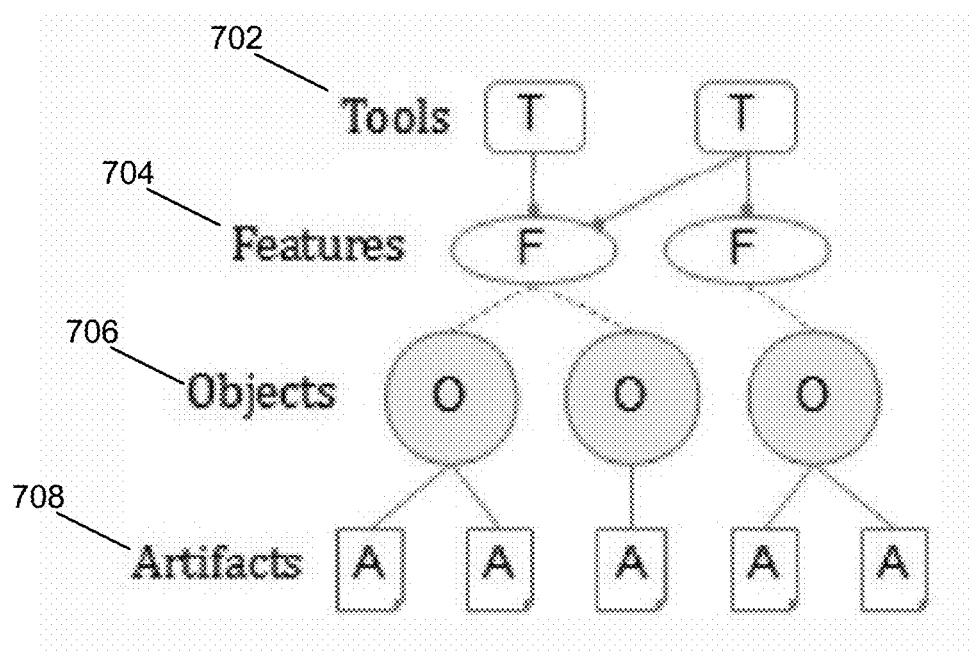
FIG. 7 illustrates relationships between customizable objects, customization artifacts, and customization features, in accordance with an embodiment of the invention.

FIG. 7 illustrates relationships between customizable objects 706, customization artifacts 708, and customization features 704, in accordance with an embodiment of the invention. A customizable object is a functional entity that may be customized. Such entities may be independent such as messages or text, or part of a larger functional entity such as UI widgets on a page. Customization artifacts 708 are the tangible by-products produced during customization of customizable objects. For example, a customization artifact may be a modified copy of the original object, a brand new object, or a file that contains the differences between the original object and its customized version.

Customization features refer to the functions and tools 702 provided by the system that enable users to perform customization. For example, some embodiments include a "Page Customization" feature that allows user manipulation of UI properties of a page through a "Page Composer" tool. In general, each feature supports customization of specific kinds of customizable objects. While a feature generally comes with one tool, multiple tools may support the same feature.

The unified sandbox framework improves user experience for customers by providing a single user interface for customization sandboxing and facilitates revision control of customization artifacts for developers by defining common behaviors and interfaces.

Figure 8:
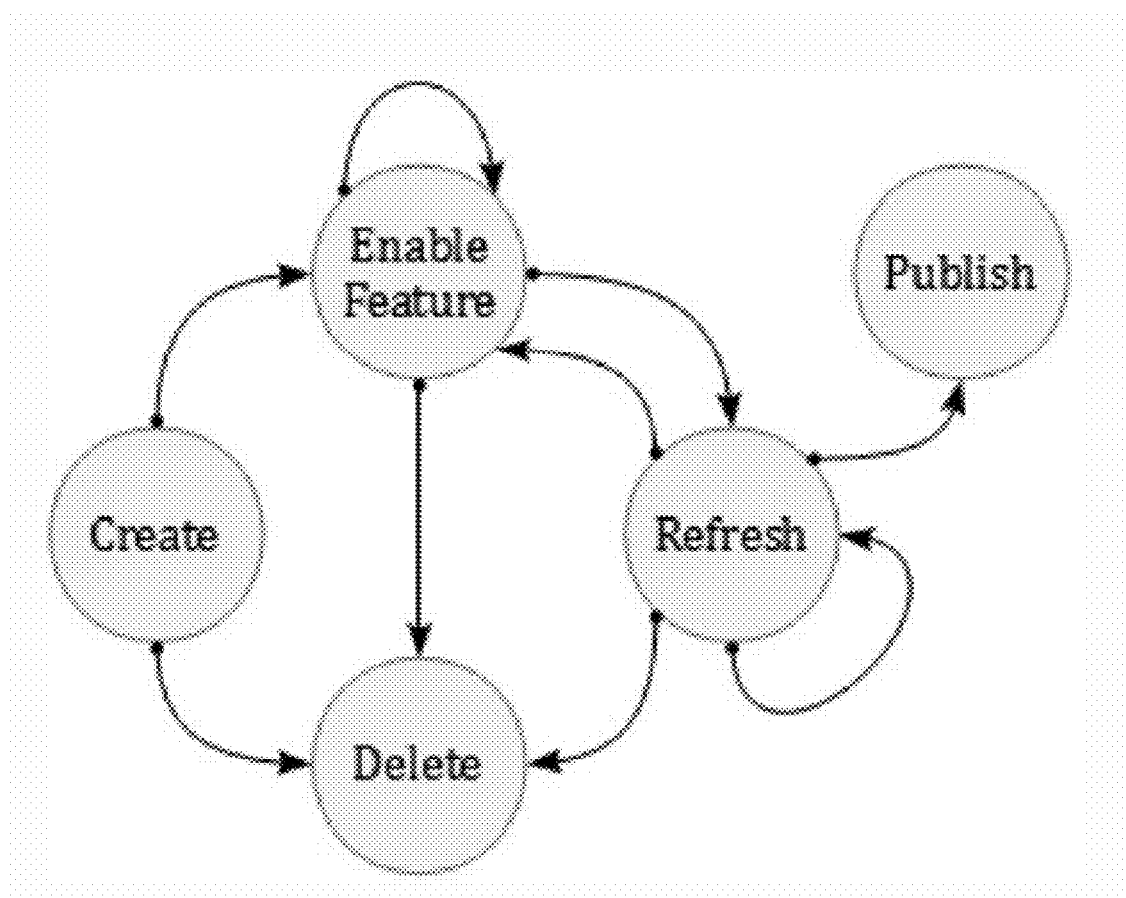
FIG. 8 illustrates the life cycle of a unified sandbox, in accordance with an embodiment of the invention.

FIG. 8 illustrates the life cycle 800 of a unified sandbox, in accordance with an embodiment of the invention. Unlike a single repository-based sandbox, the unified sandbox platform/framework encapsulates multiple customization features and their sandboxing mechanisms in order to present a single workflow to users. The unified sandbox framework unifies the sandboxing flows of participating customization features by forming a single transaction across all repositories—the customization artifacts from all participating customization features are either all committed or all rolled back. The unified sandbox framework also supports a runtime labeling mechanism for applications to run correctly while being customized.

The unified sandbox framework uses customization features as logical groups for the purposes of lazily initializing a unified sandbox (e.g., only after a feature is enabled in a unified sandbox, the corresponding data storage is created) and presenting customization to users (the customization performed in a unified sandbox is displayed as changes to customizable objects, not as a list of customization artifacts). A customization feature essentially defines a logical group of customization artifacts. Customization features may be enabled in a unified sandbox on demand, often by customization tools.

Since customization artifacts may be stored in different data structures, there is no single mechanism to label or sandbox all customization artifacts from all customization features. The unified sandbox framework allows customization artifacts to be grouped into sandboxed repositories.

As a form of revision control, the management of customization artifacts revolves around the following terms:

Mainline: The main copies of the artifacts utilized at (production) runtime when a user is not in a sandbox;

Label: A tag that is attached to a version of an artifact;

Mainline Tip: The latest versions of all artifacts in mainline (note that the latest versions may or may not be labeled); and Branch: Extra copies of the artifacts from mainline (once copied, these copies have their own version histories independent from the version histories of mainline).

For each sandbox, a branch of the repository is created. When a user is in a sandbox, the copies from the corresponding branch are utilized. A sandboxed repository is a set of customization artifacts that share the same sandboxing and labeling mechanism. A sandboxed repository supports versioning and branching as shown, for example, in FIG. 9.

Figure 9:
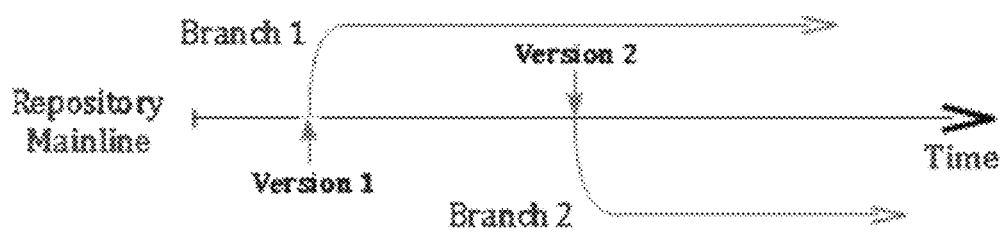
FIG. 9 illustrates a sequence diagram of the functionality of versioning and branching supported by a sandbox repository, in accordance with an embodiment of the invention.

FIG. 9 illustrates a sequence diagram 900 of the functionality of versioning and branching supported by a sandbox repository, in accordance with an embodiment of the invention. Versioning refers to the ability to create a version history of the repository and allow access to older versions. Branching refers to the ability to create multiple copies of the repositories for independent updates, and the ability to create new artifacts in these copies. All artifacts in a sandboxed repository share the same label. The unified sandbox framework allows exactly one label to represent a snapshot of all artifacts of a sandboxed repository. This label is used at runtime to identify which versions of customization artifacts make up a state where applications run correctly.

Figure 10:
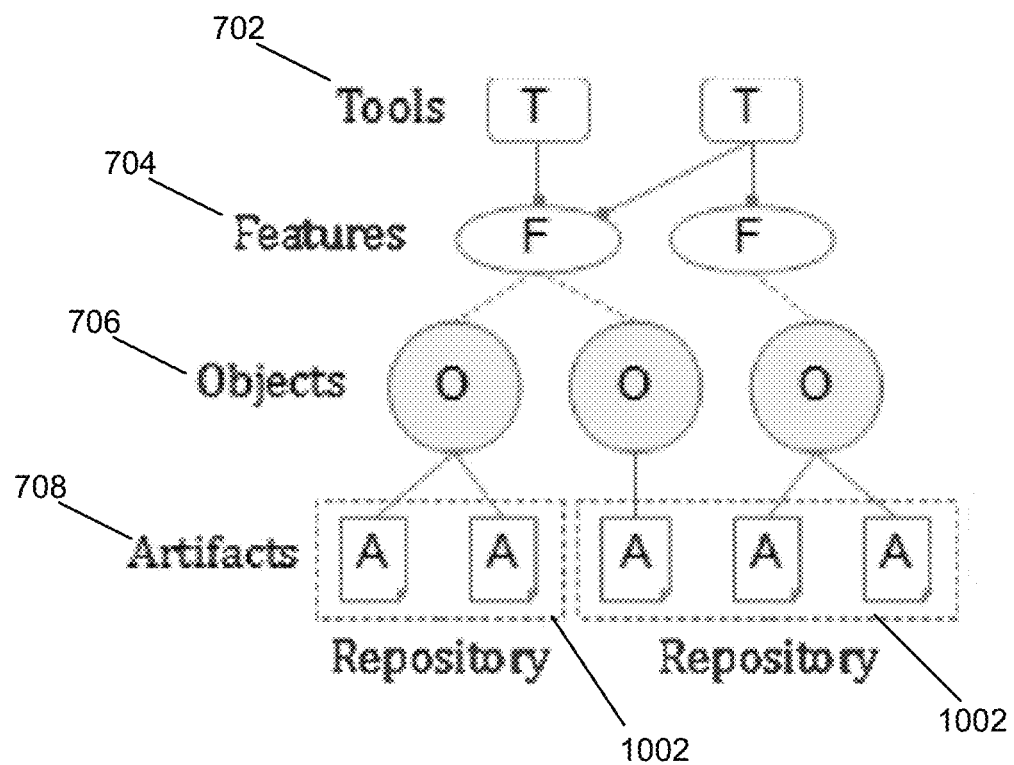
FIG. 10 illustrates sandbox repositories defining technical groups of customization artifacts of FIG. 7, in accordance with an embodiment of the invention.

FIG. 10 illustrates sandbox repositories 1002 defining technical groups of customization artifacts 708 of FIG. 7, in accordance with an embodiment of the invention. A customization feature defines a logical group of customization artifacts while a sandboxed repository (e.g., 1002) defines a technical group of customization artifacts. The unified sandbox framework requires each customization feature to specify a list of sandboxed repositories that contain all customization artifacts produced by the feature.

Figure 11:
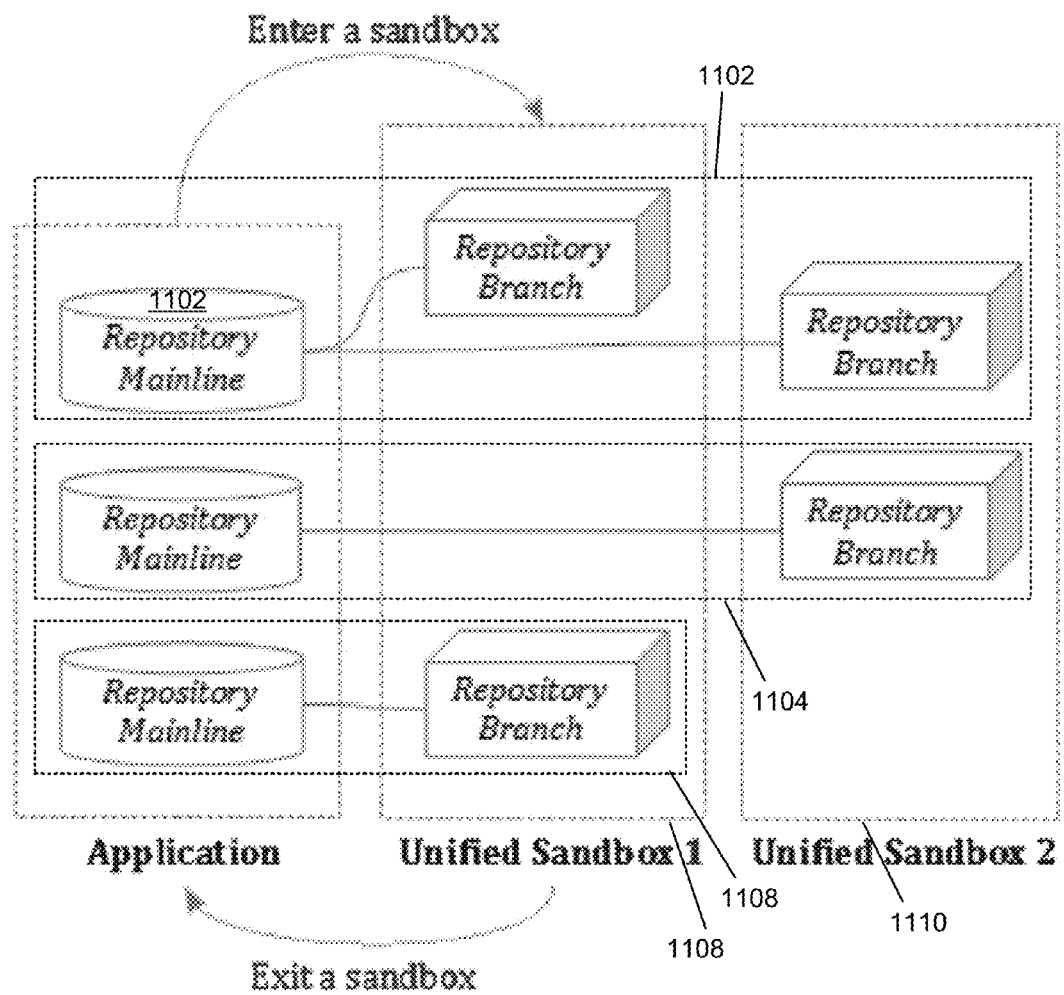
FIG. 11 illustrates unified sandboxes consisting of sandboxed repositories, in accordance with an embodiment of the invention.

FIG. 11 illustrates unified sandboxes 1108 and 1110 including sandboxed repositories 1102-1106, in accordance with an embodiment of the invention. A unified sandbox includes of one or more sandboxed repositories from enabled customization features. Most unified sandbox operations are delegated to participating sandboxed repositories. Without customization features in the picture, a unified sandbox is basically a container and a controller of all participating sandboxed repositories. For example, unified sandbox 1108 consists of branches of sandboxed repositories 1102 and 1108. And unified sandbox 1110 consists of branches of sandboxed repositories 1102 and 1104.

Figure 12:
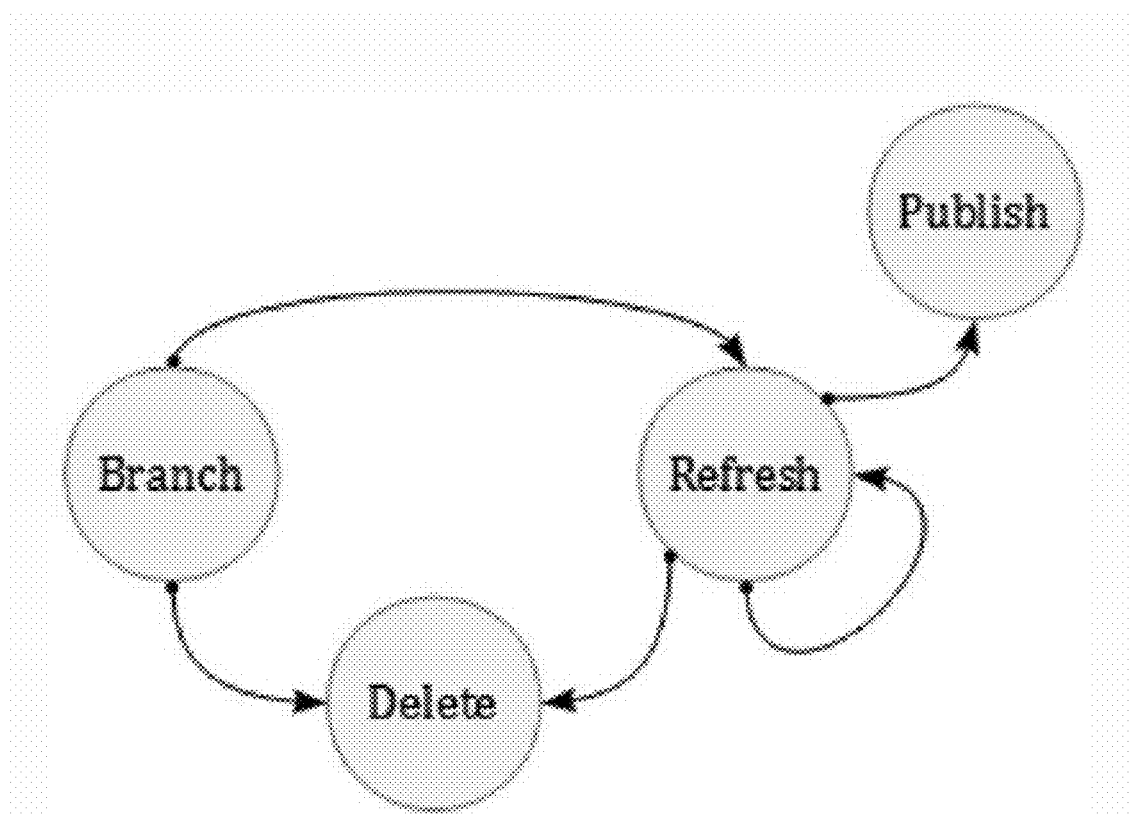
FIG. 12 illustrates the life cycle of a sandboxed repository in a unified sandbox, in accordance with an embodiment of the invention.

FIG. 12 illustrates the life cycle 1200 of a sandboxed repository in a unified sandbox, in accordance with an embodiment of the invention. Life cycle 1200 includes branch, refresh, delete, and publish operations. The branch operation includes creating a working copy for the unified sandbox (this is when copies of customization artifacts are made for isolated updates). The refresh operation includes bringing in changes from mainline to the repository (this operation can be repeated as needed). The delete operation includes deleting or disabling the branch without publishing the contents. The publish operation includes merging the changes in the branch back to mainline.

To maintain atomicity of the transaction and minimize merge conflicts, the unified sandbox framework guarantees that: changes from all participating sandboxed repositories are either all committed or all rolled back; sandboxed repository is always refreshed to reflect the latest changes in mainline before it is published; and only one unified sandbox is published at a time (i.e., the publishing of unified sandboxes is synchronized).

In some embodiments, a Customization Set Migration ("CSM") function is included that allows customers to export customization artifacts from one environment and import them to another. In such embodiments, a unified sandbox can be constructed from the exported data from CSM. First, the customization artifacts exported by CSM are archived as is. Next, each sandboxed repository of the involved customization features implement a flavor of branch operation which takes in a particular object, such as a "SandboxArchive" object, provided by the unified sandbox framework. The "SandboxArchive" object describes the CSM archive and provides information regarding the CSM archive. When CSM creates a new unified sandbox intended for data import, each CSM module is notified to enable its relevant sandboxed features. Enabling a sandboxed feature will add its dependent repositories into the sandbox. When a repository is added to the CSM sandbox, the branch operation which takes in a "SandboxArchive" object will be invoked. The unified sandbox created by CSM functions the same as a normal unified sandbox.

For the unified sandbox framework to support a customization feature, the feature is described, and the involved sandboxed repositories are defined. The technical requirements are divided into the following categories: describing the feature in terms of customizable objects and customization artifacts involved; controlling runtime access to customization artifacts; and supporting sandbox operations for each sandboxed repository. For a customization feature to be enabled in a unified sandbox, the feature should provide: (a) the sandboxed repositories that contain customization artifacts this feature can possibly produce; (b) the high-level description of customization in a unified sandbox done to customizable objects by this feature; and (c) the high-level description of merge conflicts occurred in the sandboxed repositories.

With respect to (b), the customization should be described in a high-level language with references users have access to. For example, instead of referring to a page by the name of the associated file, the page title may be used. The customization will be presented on the UI as a list of customizable objects and summaries of the changes to them. The name, type, the time of the last update, and the user that makes the last update of a customizable object are to be provided. Optionally, a summary of what is changed may also be provided. In general, there are two ways of producing such information: enhancing customization tools to capture the information when users perform customization; or analyzing the customization artifacts provided by sandboxed repositories (this may not be possible in some cases because customization artifacts may be tied to the underlying technologies, not to the functional objects users see on the UI). With respect to (c), similar to reporting changes, the customization feature may analyze the conflicted customization artifacts to produce this information. A customization feature is expected to know the relationship between the customizable objects and their corresponding customization artifacts.

Optionally a customization feature may provide the links to the customization tools pertaining to the customizable objects, such as those that have been customized.

FIG. 13 is a table 1300 defining operations supported by each customization feature, in accordance with an embodiment of the invention. As shown in table 1300, each customization feature supports "getChanges" and "getConflicts" operations.

At runtime, when a user is currently in a unified sandbox a customization tool may decide whether or not to enable certain customization features. The unified sandbox framework provides API and UI task flows for customization tools to enable customization features. Access to a customization artifact at runtime is restricted as opposed to always allowing access to the latest version of the artifact. This is achieved by the use of certified baselines.

Figure 14:
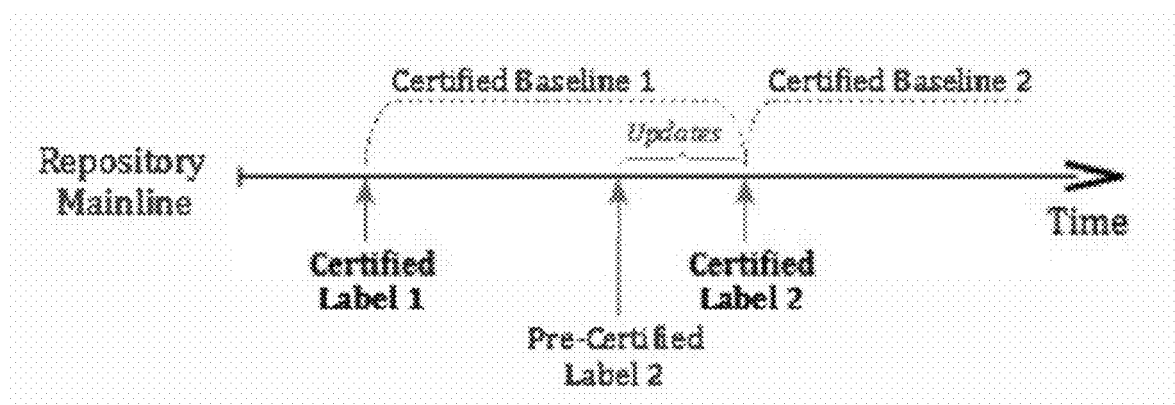
FIG. 14 illustrates certified baselines of a sandboxed repository, in accordance with an embodiment of the invention.

FIG. 14 illustrates certified baselines of a sandboxed repository, in accordance with an embodiment of the invention. A certified baseline of a repository refers to an approved state of the repository mainline where the versions of the artifacts have been verified to work correctly with each other. A certified label is used to mark the beginning of a certified baseline.

Certified baselines and their starting labels identify the approved states of a repository between updates. When applications access the repository only in these approved states, users are shielded from potential application breakage caused by unauthorized or unexpected updates in the latest versions. Running applications with a "snapshot" of the repository also allows the repository mainline to be updated "live" without affecting existing user sessions.

The unified sandbox framework starts a new certified baseline immediately after a unified sandbox is published successfully. In this case, certified labels are created and provided by sandboxed repositories. There may also be cases where a new certified baseline is not started by publishing a unified sandbox; for example, patching application metadata may start a new baseline. The unified sandbox framework keeps the history of certified labels. Certified labels are essentially checkpoints between repository updates.

Given that updates (either by sandbox publishing or patching) to mainline will always take some time, a label may be created immediately before the update begins. This label is called a "pre-certified label." A pre-certified label serves the following purposes: a pre-certified label marks the restoration point in case the update fails (all artifacts can be restored to the versions tagged by the pre-certified label); and the existence of a pre-certified label notifies the runtime that an update to mainline is about to begin (existing user sessions may be put in a special mode to ensure the success of the update). In the simplest case, the pre-certified label is the same as the previous certified label.

The runtime that utilizes the sandboxed repository makes use of the certified label information provided by the unified sandbox framework to regulate access control of the customization artifacts. The sandbox or certified label that provides the versions of customization artifacts must remain the same throughout a user session. The unified sandbox framework ensures that a user session has to end in order to exit a sandbox or switch to a different sandbox. This behavior reduces the possibility of applications getting into an inconsistent state where two versions of the same artifact are simultaneously being used in the same application due to caching of the old version. Note that ending a user session does not necessarily imply an explicit sign-out. Features such as "Return to Home" or "Reset Application" may implicitly sign the user out and sign the user back in without asking for credentials.

In the beginning of a session, the latest certified label is obtained from the unified sandbox framework and saved in the session. In some embodiments this is done by an application framework such as, for example, ADF and/or ApplCore in Oracle Fusion applications, when the unified sandbox framework feature is enabled.

In the beginning of every request, the repository runtime must determine where to retrieve an artifact based on the context. The unified sandbox framework administration API provides the context. When a user is inside a sandbox, the version in the sandbox is returned for read operations, and the version in the sandbox branch is updated on write (update/create) operations (new artifacts are created only in the sandbox branch).

When a user is outside a sandbox, the version tagged by the session label is returned for read operations, and write (update/create) operations are disallowed. In some embodiments, in certain cases, customization artifacts may be updated or created without sandboxing. If a repository is to support such cases, the artifacts should be carefully categorized to minimize potential conflicts between mainline and sandboxes. Even when there is no merge conflicts, an artifact that is allowed to be updated both directly in mainline and in a sandbox may not function correctly when changes from both are finally merged.

In some embodiments, a repository can allow updates to customization artifacts without sandboxing. If a repository allows updates to customization artifacts without sandboxing and either of the following conditions is true then the repository must become read-only immediately before a sandbox is published and throughout the duration of sandbox publishing: the artifacts allowed to be updated without sandboxing can also be updated within a sandbox; or the artifacts allowed to be updated without sandboxing depend on any of the artifacts that can be updated in a sandbox.

The repository freeze is to minimize potential merge conflicts when the contents of a sandbox branch are merged back to mainline. The unified sandbox framework administration API provides a way for repository runtime to detect such period: during Sandbox Publishing, for a read operation the version tagged by the session label is returned, and write operations (update/create) are disallowed (user are urged to sign out immediately).

FIG. 15 is a table 1500 illustrating operations supported by a sandboxed repository, in accordance with an embodiment of the invention. In embodiments, sandboxed repositories support branch, refresh/undo, publish/undo, destroy, and "getChanges" operations, as shown in table 1500.

FIG. 16 is a table 1600 illustrating additional operations that are supported by a sandboxed repository, in accordance with an embodiment of the invention. In embodiments, sandboxed repositories also support branch (from archive), "prePublish," "refreshCompleted," "publishCompleted," and test operations, as shown in table 1600.

In some embodiments, the unified sandbox framework is implemented in components including a runtime code component and an administration code component. Runtime code is code within repository runtime to perform access control or enable a customization feature. There will be calls to the unified sandbox framework administration API to obtain information such as whether the current user is in a sandbox or the certified label in the session. This code will be part of Fusion applications runtime through either a library reference or a (remote) task flow. Administration code is packaged with a "Sandbox Orchestration Application" to perform sandbox operations. "Sandbox Orchestration Application" is the application that provides the unified sandbox framework administration UI. It is generally hosted on its own server which is different from the servers where Fusion applications are hosted. That means the administration code may need to utilize remote procedures such as Web services if the repository is not accessible from where "Applications Setup" is hosted.

Figure 17:
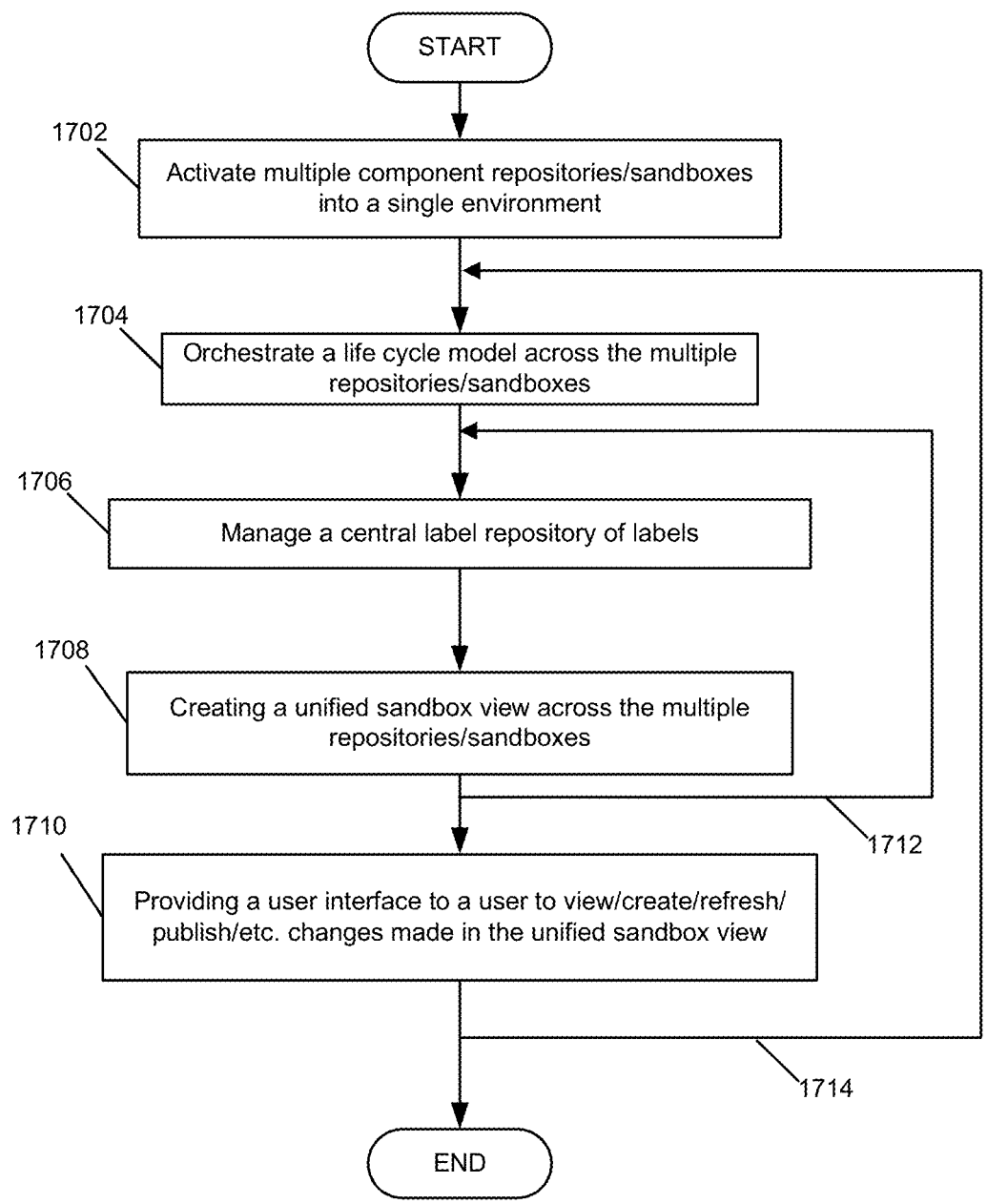
FIG. 17 illustrates a flow diagram of the functionality of managing a unified sandbox environment, in accordance with an embodiment of the invention.

FIG. 17 illustrates a flow diagram of the functionality of managing a unified sandbox environment, in accordance with an embodiment of the invention. In one embodiment, the functionality of the flow diagram of FIG. 17, and the functionality of the flow/block diagrams of FIGS. 4 and 6, are each implemented by software stored in memory or other computer-readable or tangible medium, and executed by a processor (e.g., a central processing unit ("CPU") and/or a graphical processing unit ("GPU")). In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 1702, multiple component repositories/sandboxes are activated in a single environment. A plurality of components can be activated in the unified sandbox environment, each component being configured to manage the lifecycle of its own component data. For example, each component can have a repository/sandbox of its own responsible to isolate changes made with respect to that component.

At 1704, a life cycle model is orchestrated across the multiple repositories/sandboxes. Orchestrating the life cycle model can include orchestrating an operation across the unified sandbox environment, the orchestrating including delegating one or more operations to the components, the components being configured to wait until all delegated operations are completed successfully before committing changes based on the delegated operations.

At 1706, a central repository of labels is managed. The managing a central label repository can include distributing labels to the components, the components being configured to associate the centrally managed labels with versions of their respective component data.

At 1708, a unified sandbox view is created across the multiple repositories/sandboxes. A unified sandbox view can be created across the respective component data of all components based on a selection of one or more of the centrally managed labels. By centrally managing the labels, a unified view across the components can be created by, for example, using one label across the components to indicate the changes associated with the unified sandbox view across the components.

At 1710, a user interface is provided to a user to allow the user to view/create/refresh/publish/etc. changes made in the unified sandbox view.

The functionality of the flow diagram of FIG. 17 can be repeated in whole or in part in order to, for example, update the unified sandbox environment, as shown, for example, at 1712 and 1714.

As disclosed, embodiments include a unified sandbox framework that can create and manage multiple different sandboxes/repositories in a single unified sandbox environment, where the sandboxes can have different repositories/technologies (i.e., the unified sandbox framework unifies multiple heterogeneous sandboxes/repositories). Therefore, the unified sandbox framework allows one user can make changes within a sandbox within the environment, and other users in the same environment will not be able to see those changes. The user can then publish the changes for all other users to see within the environment. To maintain a unified view across sandboxes/repositories, the unified sandbox framework manages a central label repository in some embodiments.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to manage a unified sandbox environment, the managing comprising:

activating a plurality of components in the unified sandbox environment, wherein each component is configured to manage a lifecycle of its respective component data;

orchestrating execution of an operation across the unified sandbox environment, the orchestrating including delegating one or more sub-operations to the components, the components configured to wait for each component of the unified sandbox environment to successfully verify execution of the sub-operations before committing changes based on the delegated sub-operations;

managing a central label repository including centrally managed labels for the components that are associated with versions of each respective component data, the central label repository being updated upon successful completion of an orchestrated operation; and creating a unified view of the unified sandbox across the respective component data based on one or more of the centrally managed labels.

2. The computer readable medium of claim 1, wherein, when one or more of the delegated sub-operations is not completed successfully, delegating a roll back sub-operation to the components.

3. The computer readable medium of claim 1, wherein the orchestrating the operation includes orchestrating an operation of a lifecycle model across all the components, the lifecycle model comprising create, refresh, and publish operations.

4. The computer readable medium of claim 1,
wherein the plurality of components includes a first component and a second component;
wherein the activating comprises:
activating a first component in the unified sandbox environment, the first component managing a lifecycle of first versioned data used by the first component, and
activating a second component in the unified sandbox environment, the second component managing a lifecycle of second versioned data used by the second component; and
wherein the first versioned data of the first component is different than that of the second component.

5. The computer readable medium of claim 4,
wherein the first version data is stored by the first component in a file system;
wherein the second version data is stored by the second component in a database.

6. The computer readable medium of claim 5, wherein the unified view is associated with a user and unifies one or more changes made by the user via the first component to the first versioned data and one or more changes made by the user via the second component to the second versioned data of the second component.

7. The computer readable medium of claim 6, wherein when the user accesses the first component, the user's one or more changes made via the second component are exposed to the first component using one or more of the centrally managed labels.

8. The computer readable medium of claim 1, wherein the plurality of components comprise first and second components, each component comprising a component repository to manage a lifecycle of its respective component data, the component repository of the first component storing a different type of data than that of the second component.

9. A method of managing a unified sandbox environment, the method comprising:
  activating a plurality of components in the unified sandbox environment, wherein each component is configured to manage a lifecycle of its respective component data;
  orchestrating execution of an operation across the unified sandbox environment, the orchestrating including delegating one or more sub-operations to the components, the components configured to wait for each component of the unified sandbox environment to successfully verify execution of the sub-operations before committing changes based on the delegated sub-operations;
  managing a central label repository including centrally managed labels for the components that are associated with versions of each respective component data, the central label repository being updated upon successful completion of an orchestrated operation; and
  creating a unified view of the unified sandbox across the respective component data based on one or more of the centrally managed labels.

10. The method of claim 9, wherein, when one or more of the delegated sub-operations is not completed successfully, delegating a roll back sub-operations to the components.

11. The method of claim 9, wherein the orchestrating the operation includes orchestrating an operation of a lifecycle model across all the components, the lifecycle model comprising create, refresh, and publish operations.

12. The method of claim 9, wherein the plurality of components includes a first component and a second component;
  wherein the activating comprises:
    activating a first component in the unified sandbox environment, the first component managing a lifecycle of first versioned data used by the first component, and
    activating a second component in the unified sandbox environment, the second component managing a lifecycle of second versioned data used by the second component; and
  wherein the first versioned data of the first component is different than that of the second component.

13. The method of claim 12,
  wherein the first version data is stored by the first component in a file system;
  wherein the second version data is stored by the second component in a database.

14. The method of claim 13, wherein the unified view is associated with a user and unifies one or more changes made by the user via the first component to the first versioned data and one or more changes made by the user via the second component to the second versioned data of the second component.

15. The method of claim 14, wherein when the user accesses the first component, the user's one or more changes made via the second component are exposed to the first component using one or more of the centrally managed labels.

16. The method of claim 13, wherein the plurality of components comprise first and second components, each component comprising a component repository to manage a lifecycle of its respective component data, the component repository of the first component storing a different type of data than that of the second component.

17. A system for providing a unified sandbox environment comprising:
  one or more processors coupled to non-transitory memory that stores instructions for providing a unified sandbox environment, wherein the unified sandbox environment comprises a default repository, a management module, an orchestration module, a management user interface module, component plugins, and a plurality of components coupled to the component plugins, each component comprising a component repository;
  wherein the instructions, when executed by the one or more processors, provide the unified sandbox environment by:
    activating the plurality of components in the unified sandbox environment, wherein each component is configured to manage a lifecycle of its respective component data;
    orchestrating execution of an operation across the unified sandbox environment, the orchestrating including delegating one or more sub-operations to the components, the components configured to wait for each component of the unified sandbox environment to successfully verify execution of the sub-operations before committing changes based on the delegated sub-operations;
    managing a central label repository including centrally managed labels for the components that are associated with versions of each respective component data, the central label repository being updated upon successful completion of an orchestrated operation; and
    creating a unified view of the unified sandbox across the respective component data based on one or more of the centrally managed labels.

18. The system of claim 17, wherein, when one or more of the delegated sub-operations is not completed successfully, delegating a roll back operation to the components.

19. The system of claim 17, wherein the orchestrating the operation includes orchestrating an operation of a lifecycle model across all the components, the lifecycle model comprising create, refresh, and publish operations.

20. The system of claim 17, wherein the plurality of components includes a first component and a second component;
  wherein the activating comprises:
    activating a first component in the unified sandbox environment, the first component managing a lifecycle of first versioned data used by the first component, and
    activating a second component in the unified sandbox environment, the second component managing a lifecycle of second versioned data used by the second component; and
  wherein the first versioned data of the first component is different than that of the second component.

* * * * *